(12) United States Patent
Varela

(10) Patent No.: US 7,314,105 B2
(45) Date of Patent: Jan. 1, 2008

(54) ELECTRIC DRIVE AXLE ASSEMBLY WITH INDEPENDENT DUAL MOTORS

(75) Inventor: Tomaz Dopico Varela, Gahanna, OH (US)

(73) Assignee: ArvinMeritor Technology, LLC, Troy, MI (US)

(*) Notice: Subject to any disclaimer, the term of this patent is extended or adjusted under 35 U.S.C. 154(b) by 430 days.

(21) Appl. No.: 10/942,709

(22) Filed: Sep. 16, 2004

(65) Prior Publication Data

US 2006/0054368 A1 Mar. 16, 2006

(51) Int. Cl.
*B60K 1/02* (2006.01)

(52) U.S. Cl. ............ 180/65.6; 180/65.1; 180/242

(58) Field of Classification Search .......... 180/65.5, 180/65.6, 65.7, 65.1, 242, 248
See application file for complete search history.

(56) References Cited

U.S. PATENT DOCUMENTS

| | | | |
|---|---|---|---|
| 638,643 A | 12/1899 | Newman | |
| 644,225 A | 2/1900 | Elsner | |
| 1,233,846 A | 7/1917 | Cochran | |
| 1,251,749 A | 1/1918 | Cilley | |
| 1,277,434 A | 9/1918 | Leadbeater | |
| 1,481,405 A | 1/1924 | Anglada | |
| 1,543,044 A | 1/1925 | Anglada | |
| 1,540,526 A | 6/1925 | Anglada | |
| 1,661,780 A | 3/1928 | Warhus | |
| 1,735,404 A | 11/1929 | Masury | |
| 1,780,370 A * | 11/1930 | Tenney | 180/363 |
| 1,906,930 A | 5/1933 | Ledwinka | |
| 2,093,859 A | 9/1937 | Austin | |
| 2,462,574 A | 2/1949 | Wallace | |
| 2,589,863 A | 3/1952 | Quartullo | |
| 3,136,379 A | 6/1964 | Lauster | |
| 3,161,083 A | 12/1964 | Roe | |
| 3,186,506 A | 6/1965 | Leach | |
| 3,503,463 A * | 3/1970 | Lestoque | 180/6.24 |
| 3,575,250 A | 4/1971 | Dykes | |
| 3,621,929 A | 11/1971 | Oberthur | |
| 3,648,795 A | 3/1972 | Moulton | |
| 3,770,073 A | 11/1973 | Meyer | |
| 3,812,928 A | 5/1974 | Rockwell | |
| 3,868,034 A | 2/1975 | Goodacre | |
| 3,899,782 A | 8/1975 | Miller | |
| 3,902,565 A | 9/1975 | Farrall | |

(Continued)

FOREIGN PATENT DOCUMENTS

CH 179299 11/1935

(Continued)

OTHER PUBLICATIONS

Rieck G., et al. "Focal Point: Electric Drive Systems for City Buses," Man Research Engineering Manufacturing, Man Aktiengeseilschaft, Munchen, DE, 1996, 4-11.

*Primary Examiner*—Jeff Restifo
(74) *Attorney, Agent, or Firm*—Carlson, Gaskey & Olds

(57) ABSTRACT

An electric drive axle includes a pair of center mounted electric motors that independently drive a pair of laterally spaced wheels. The electric drive axle includes an axle housing assembly that extends between the pair of laterally spaced wheels. Both center mounted electric motors preferably do not include connections to a chassis and are solely supported by the axle housing assembly near a vehicle centerline.

22 Claims, 2 Drawing Sheets

U.S. PATENT DOCUMENTS

| | | | |
|---|---|---|---|
| 3,930,551 A | 1/1976 | Cragg | |
| 3,933,217 A | 1/1976 | Eichinger | |
| 4,089,384 A | 5/1978 | Ehrenberg | |
| 4,146,104 A | 3/1979 | Leembruggen | |
| 4,270,622 A | 6/1981 | Travis | |
| 4,330,045 A | 5/1982 | Myers | |
| 4,339,015 A | 7/1982 | Fowkes | |
| 4,372,407 A * | 2/1983 | McColl | 180/6.2 |
| 4,429,758 A | 2/1984 | Meshulam | |
| 4,433,744 A | 2/1984 | Muhlbacher | |
| 4,469,369 A | 9/1984 | Belik | |
| 4,534,442 A | 8/1985 | Botar | |
| 4,570,739 A | 2/1986 | Kramer | |
| 4,658,189 A | 4/1987 | Trusock | |
| 4,799,564 A | 1/1989 | Iijima | |
| 4,930,590 A | 6/1990 | Love | |
| 5,199,524 A | 4/1993 | Ivancic | |
| 5,222,568 A | 6/1993 | Higasa | |
| 5,238,454 A | 8/1993 | Schmidt | |
| 5,382,854 A | 1/1995 | Kawamoto | |
| 5,419,406 A | 5/1995 | Kawamoto | |
| 5,435,793 A | 7/1995 | Varela | |
| 5,443,130 A | 8/1995 | Tanaka | |
| 5,465,806 A | 11/1995 | Higasa | |
| 5,558,174 A | 9/1996 | Avitan | |
| 5,662,184 A | 9/1997 | Riemer | |
| 5,667,029 A | 9/1997 | Urban | |
| 5,715,901 A | 2/1998 | Tokushima | |
| 5,743,348 A | 4/1998 | Coppola | |
| 5,829,542 A * | 11/1998 | Lutz | 180/65.6 |
| 5,847,470 A | 12/1998 | Mitchell | |
| 5,853,059 A | 12/1998 | Goertzen | |
| 5,878,830 A | 3/1999 | Ruppert | |
| 5,924,504 A | 7/1999 | Ruppert | |
| 5,941,790 A | 8/1999 | Steen | |
| 5,950,751 A | 9/1999 | McComber | |
| 6,095,269 A | 8/2000 | Hosaka | |
| 6,145,611 A | 11/2000 | Haddad | |
| 6,148,940 A * | 11/2000 | Hokanson et al. | 180/65.5 |
| 6,196,342 B1 | 3/2001 | Teal | |
| 6,276,474 B1 | 8/2001 | Ruppert | |
| 6,431,298 B1 | 8/2002 | Ruppert | |
| 6,615,946 B2 * | 9/2003 | Pasquini et al. | 180/248 |
| 6,880,654 B2 * | 4/2005 | Plishner | 180/65.6 |
| 6,978,853 B2 * | 12/2005 | Bennett | 180/65.1 |
| 7,083,015 B2 * | 8/2006 | Ruppert et al. | 180/65.1 |

FOREIGN PATENT DOCUMENTS

| | | |
|---|---|---|
| CH | 679027 | 12/1991 |
| DE | 4112624 C1 | 10/1992 |
| DE | 4217260 A1 | 12/1993 |
| DE | 4322517 A1 | 2/1994 |
| EP | 0 417 326 A1 | 3/1991 |
| FR | 2507550 | 12/1982 |
| GB | 339241 | 5/1930 |
| GB | 502313 | 3/1939 |
| GB | 1303615 | 1/1973 |
| GB | 2176852 | 6/1985 |
| SE | 85880 | 1/1936 |
| WO | WO 90/11905 | 10/1990 |
| WO | WO 97/09192 | 3/1997 |

* cited by examiner

ELECTRIC DRIVE AXLE ASSEMBLY WITH INDEPENDENT DUAL MOTORS

TECHNICAL FIELD

The subject invention relates to an electric drive axle that includes a pair of independent center electric motors mounted to a common axle housing for driving laterally opposed vehicle wheels.

BACKGROUND OF THE INVENTION

Electric drive axles include at least one electric motor that provides power to drive first and second vehicle wheels. The first and second vehicle wheels are laterally spaced apart from each other and rotate about a common lateral axis.

In one known configuration, one electric motor is mounted at each of the first and second vehicle wheels to independently drive the first vehicle wheel from the second vehicle wheel. One disadvantage with this configuration is that the location of the electric motors presents packaging problems. When electric motors are positioned close to each of the first and second vehicle wheels, it is difficult to package the electric motors with conventional brakes and suspension components given existing vehicle configurations.

In another known configuration, a single electric motor is used to drive both the first and second vehicle wheels. This configuration also has disadvantages. When a high speed motor is used, a reduction box is required to achieve desired output speed and torque levels. When a smaller induction motor is used, a summation box is required to achieve desired output speed and torque levels. In addition to the reduction box or summation box, a conventional driveshaft and a conventional drive axle with a differential gear assembly is required to provide final reduction and differential action. These additional components significantly increase cost. Further, the electric motor is typically mounted to a vehicle chassis, which requires additional components such as a motor support frame and noise vibration isolators. This also increases cost and assembly time.

Thus, there is a need for an electric drive axle that can provide independent wheel drive with conventional brake and suspension packaging as well as overcoming the other above-mentioned deficiencies in the prior art.

SUMMARY OF THE INVENTION

An electric drive axle includes first and second wheel ends that are laterally spaced apart from each other along a lateral axis. A first electric motor drives the first wheel end and a second electric motor drives the second wheel end independently from the first electric motor. The first and second electric motors are mounted to the electric drive axle near a longitudinal vehicle centerline.

In one disclosed embodiment, the first electric motor is laterally spaced apart from the first wheel end by a first lateral distance along the lateral axis, the second electric motor is laterally spaced apart from the second wheel end by a second lateral distance along the lateral axis, and the first and second electric motors are spaced apart from each other by a third lateral distance along the lateral axis. The first and second lateral distances are both greater than the third lateral distance.

Preferably, the longitudinal vehicle centerline is perpendicular to the lateral axis and is approximately equally spaced apart from each of the first and second wheel ends. The first electric motor is positioned on one immediate side of the longitudinal vehicle centerline and the second electric motor is positioned on an opposite immediate side of the longitudinal vehicle centerline.

The electric drive axle includes an axle housing that extends between the first and second wheel ends. The first wheel end is supported at one end of the axle housing and the second wheel end is supported at an opposite end of the axle housing. The first and second electric motors are solely supported by a center portion of the axle housing.

In one disclosed embodiment, the first electric motor drives a first gear set, which drives a first axle shaft coupled to the first wheel end. The second electric motor drives a second gear set, which drives a second axle shaft coupled to the second wheel end. The first gear set includes a first input gear driven by a first motor output shaft about a first longitudinal axis, and a first output gear driven by the first input gear about the lateral axis. The first output gear is coupled to the first axle shaft and first wheel end, which together rotate about the lateral axis. The second gear set includes a second input gear driven by a second motor output shaft about a second longitudinal axis, and a second output gear driven by the second input gear about the lateral axis. The second output gear is coupled to the second axle shaft and second wheel end, which together rotate about the lateral axis.

The subject invention provides an electric drive axle with independent wheel drive provided by centrally mounted electric motors. The electric motors are not supported by a chassis, thus the need for a motor support frame and isolators is eliminated. Further, the subject electric drive axle does not require a differential, center reduction box, or summation box, and can be packaged within an envelope defined by a conventional planetary or single reduction drive axle. These and other features of the present invention can be best understood from the following specification and drawings, the following of which is a brief description.

DETAILED DESCRIPTION OF THE PREFERRED EMBODIMENT

Figure 1:
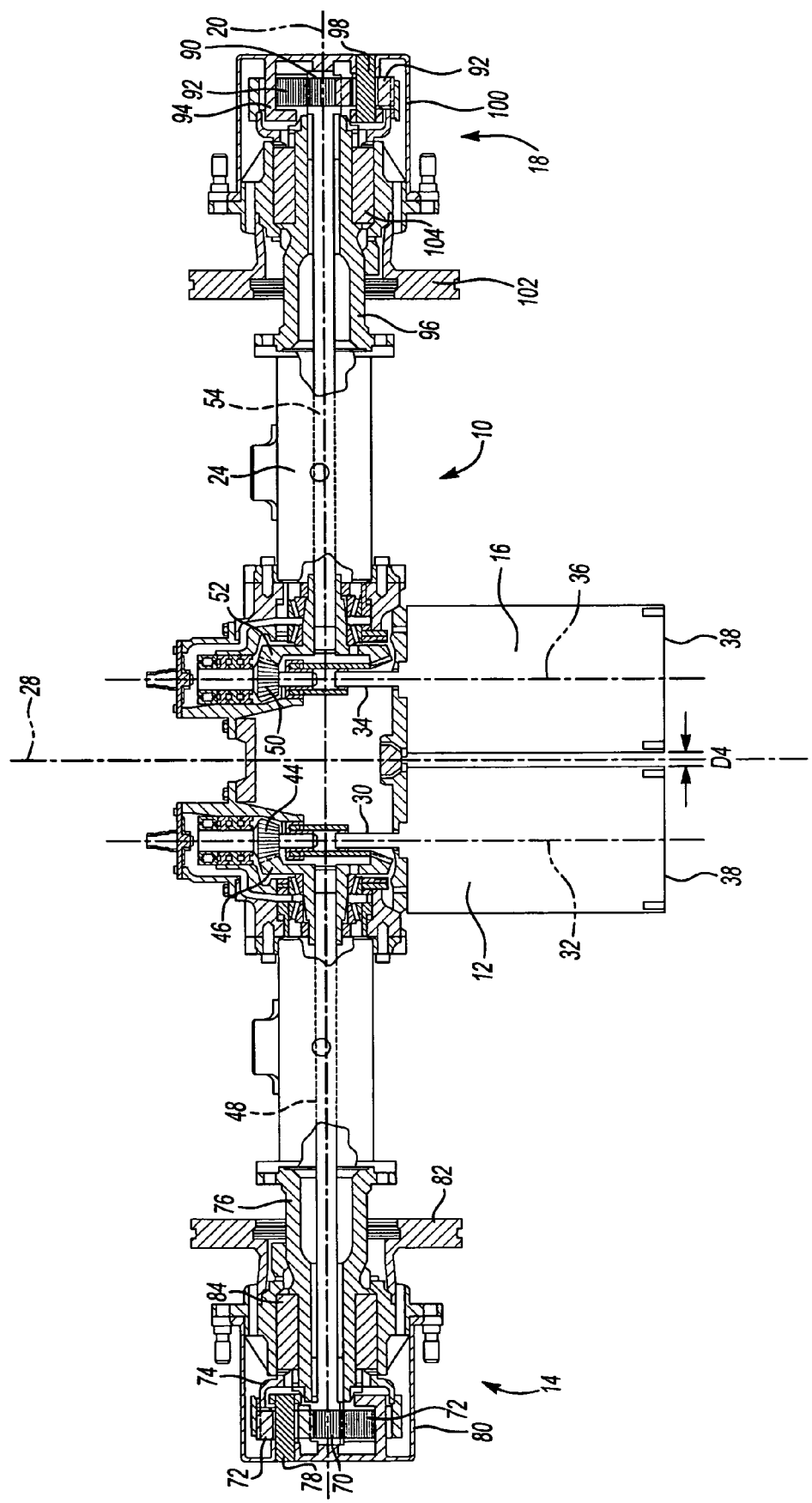
FIG. 1 is an overhead view, shown in partial cross-section, of an electric drive axle incorporating the subject invention.

FIG. 1 shows an electric drive axle 10 that includes a first electric motor 12 for driving a first wheel end 14 and a second electric motor 16 for driving a second wheel end 18. The first electric motor 12 drives the first wheel end 14 independently from the second electric motor 16.

The first 14 and second 18 wheel ends together define a lateral axis 20. The first 14 and second 18 wheel ends include wheels 22 (FIG. 2) that support tires (not shown) that rotate about the lateral axis 20.

Figure 2:
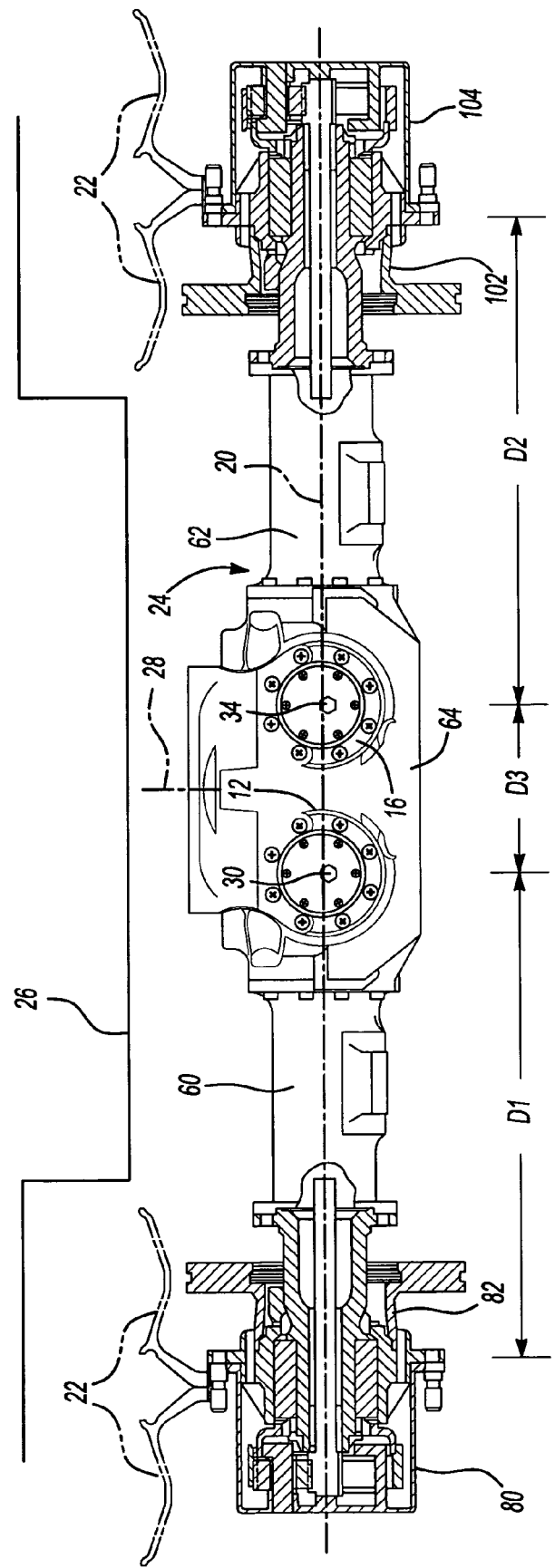
FIG. 2 is a front view, shown in partial cross-section, of the electric drive axle of FIG. 1.

An axle housing 24 extends between the first 14 and second 18 wheel ends. As shown in FIG. 2, the first 12 and second 16 electric motors are solely supported by the axle housing 24 and do not require additional mounting to a vehicle chassis 26. The first 12 and second 16 electric motors are mounted to a center portion of the axle housing 24 near a longitudinal vehicle centerline 28. The longitudinal vehicle centerline 28 is perpendicular to and intersects the lateral axis 20. The longitudinal vehicle centerline 28 is approximately equally spaced apart from the first 14 and second 18 wheel ends. The first electric motor 12 is positioned on one immediate side of the longitudinal vehicle centerline 28 and the second electric motor 16 is positioned on an opposite immediate side of the longitudinal vehicle centerline 28.

The first electric motor 12 includes a first motor output shaft 30 that rotates about a first longitudinal axis 32 (see FIG. 1). The second electric motor 16 includes a second motor output shaft 34 that rotates about a second longitudinal axis 36. The first 32 and second 36 longitudinal axes are parallel to and spaced apart from each other.

The first electric motor 12 is laterally spaced apart from the first wheel end 14 by first lateral distance D1 along the lateral axis 20. The second electric motor 16 is laterally spaced apart from the second wheel end 18 by a second lateral distance D2 along the lateral axis 20. The first electric motor 12 is laterally spaced apart from the second electric motor 16 along the lateral axis 20 by a lateral distance. This lateral distance can be defined as a third lateral distance D3 (FIG. 2) between the first 32 and second 36 longitudinal axes or as a fourth lateral distance D4 (FIG. 1) between respective motor housings 38 of the first 12 and second 16 electric motors.

The first D1 and second D2 lateral distances are greater than the third D3 and forth D4 lateral distances. Preferably, D1 and D2 are at least two times greater than D3 and D4. This configuration allows the first 12 and second 16 electric motors to be centrally mounted away from the first 14 and second 18 wheel ends, which allows conventional brake and suspension packaging constraints to be used, yet still provides independent wheel drive without requiring a center differential.

The first motor output shaft 30 drives a first gear set and the second motor output shaft 34 drives a second gear set. The first and second gear sets preferably include bevel gears, however, other gearing types could also be used. The first gear set includes an input gear 44 that is driven by the first motor output shaft 30 about the first longitudinal axis 32, and an output gear 46 that is driven by the input gear 44 about the lateral axis 20. The input gear 44 is preferably a pinion gear and the output gear 46 is preferably a ring gear. The output gear 46 is directly coupled to drive a first axle shaft 48 about the lateral axis 20. The first axle shaft 48 provides driving input for the first wheel end 14.

The second gear set includes an input gear 50 that is driven by the second motor output shaft 34 about the second longitudinal axis 36, and an output gear 52 that is driven by the input gear 50 about the lateral axis 20. The input gear 50 is preferably a pinion gear and the output gear 52 is preferably a ring gear. The output gear 52 is directly coupled to drive a second axle shaft 54 about the lateral axis 20. The second axle shaft 54 provides driving input for the second wheel end 18.

The axle housing 24 includes a first housing portion 60 that extends between the first electric motor 12 and the first wheel end 14 and a second housing portion 62 that extends between the second electric motor 16 and the second wheel end 18. A third housing portion 64 extends between the first 60 and second 62 housing portions. The first housing portion 60 substantially encloses the first axle shaft 48 and the second housing portion 62 substantially encloses the second axle shaft 54. The first 12 and second 16 electric motors are substantially supported by the third housing portion 64. In one example, the first 60, second 62, and third 64 housing portions divide the axle housing generally into thirds, with each of the first 60, second 62, and third 64 housing portions having an approximately equal length. Thus, the first 12 and second 16 electric motors are supported on a center third of the axle housing 24. It should be understood that this is just one example of a mounting configuration, and that other configurations could also be used.

In one configuration, the first wheel end 14 includes a first planetary gear set that includes a first sun gear 70, a plurality of planet gears 72, and a planet carrier 74. The first axle shaft 48 is in driving engagement with the first sun gear 70, which is in meshing engagement with the plurality of planet gears 72. The first sun gear 70 rotates about the lateral axis 20. The planet carrier 74 is fixed to a non-rotating spindle 76 that is fixed to the axle housing 24. Each planet gear 72 is supported on a planet pin 78 (only one is shown) that is fixed to rotate with a first wheel hub 80. The first planetary gear set provides additional torque and lower wheel speed as needed at the first wheel end 14.

A first rotating brake component 82, such as a brake disc, is mounted for rotation with the first wheel hub 80. Non-rotating brake components (not shown) selectively engage the first rotating brake component 82 in response to a braking command. The first rotating brake component 82 and the first wheel hub 80 are supported for rotation relative to the non-rotating spindle 76 by a bearing assembly shown schematically at 84.

The second wheel end 18 includes a second planetary gear set that includes a second sun gear 90, a plurality of planet gears 92, and a planet carrier 94. The second axle shaft 54 is in driving engagement with the second sun gear 90, which is in meshing engagement with the plurality of planet gears 92. The second sun gear 90 rotates about the lateral axis 20. The planet carrier 94 is fixed to a non-rotating spindle 96 that is fixed to the axle housing 24. Each planet gear 92 is supported on a planet pin 98 that is fixed to rotate with a second wheel hub 100. The second planetary gear set provides additional torque and lower wheel speed as needed at the second wheel end 18.

A second rotating brake component 102, such as a brake disc, is mounted for rotation with the second wheel hub 100. Non-rotating brake components (not shown) selectively engage the second rotating brake component 102 in response to a braking command. The second rotating brake component 102 and the second wheel hub 100 are supported for rotation relative to the non-rotating spindle 96 by a bearing assembly shown schematically at 104.

The subject invention provides an electric drive axle 10 with independent first 12 and second 16 electric motors and high speed bevel gear reduction on a center portion of an axle housing 24. This allows the electric drive axle 10 to be packaged in an envelope that would be occupied by a conventional planetary or single reduction drive axle. The need for a driveline is eliminated, as well as the need for a motor supporting frame and noise vibration isolators. Further, because the first 12 and second 16 electric motors are connected to drive different wheel ends, the need for a mechanical differential case is eliminated. Differential action is automatically provided by the first 12 and second 16 electric motors. Through electronic controls, the first 12 and second 16 electric motors can provide or enhance traction and stability controls. Optionally, a compact planetary two speed shifter can be added to the output of the first and second gear sets, as described above, to extend the torque range and speeds of the first 12 and second 16 electric motors.

Although a preferred embodiment of this invention has been disclosed, a worker of ordinary skill in this art would recognize that certain modifications would come within the

What is claimed is:

1. A drive axle comprising:
a first wheel end assembly defining a lateral axis of rotation;
a second wheel end assembly laterally spaced from said first wheel end assembly along said lateral axis of rotation;
a first electric motor including a first motor output shaft that rotates about a first longitudinal axis and which is operably coupled to drive said first wheel end assembly; and
a second electric motor including a second motor output shaft that rotates about a second longitudinal axis and which is operably coupled to drive said second wheel end assembly independently from said first wheel end assembly, and wherein said first electric motor is laterally spaced apart from said first wheel end assembly along said lateral axis of rotation by a first distance, said second electric motor is laterally spaced apart from said second wheel end assembly along said lateral axis of rotation by a second distance, and said first and second electric motors are spaced apart from each other along said lateral axis of rotation by a third distance, said first and second distances both being greater than said third distance.

2. The drive axle according to claim 1 wherein said first distance is at least two times greater than said third distance and said second distance is at least two times greater than said third distance.

3. The drive axle according to claim 1 wherein said first and second distances are approximately equal.

4. The drive axle according to claim 1 including a first gear set driven by said first electric motor and a first axle shaft driven by said first gear set wherein said first axle shaft rotates about said lateral axis of rotation and is operably coupled to drive said first wheel end assembly; and
including a second gear set driven by said second electric motor and a second axle shaft driven by said second gear set wherein said second axle shaft rotates about said lateral axis of rotation and is operably coupled to drive said second wheel end assembly.

5. The drive axle according to claim 4 wherein said first motor output shaft is coupled to drive said first gear set, and said second motor output shaft is coupled to drive said second gear.

6. The drive axle according to claim 5 wherein said first wheel end assembly includes a first wheel hub and said second wheel end assembly includes a second wheel hub and wherein said first distance is defined as a first lateral distance between said first wheel hub and said first longitudinal axis of rotation and said second distance is defined as a second lateral distance between said second wheel hub and said second longitudinal axis of rotation.

7. The drive axle according to claim 5 including a first planetary gear set driven by said first axle shaft and a second planetary gear set driven by said second axle shaft.

8. The drive axle according to claim 1 wherein said first longitudinal axis intersects said lateral axis of rotation and said second longitudinal axis intersects said lateral axis of rotation wherein said first distance is defined as a first lateral distance between said first longitudinal axis and said first wheel end assembly and said second distance is defined as a second lateral distance between said second longitudinal axis and said second wheel end assembly.

9. The drive axle according to claim 1 wherein said first and second electric motors extend in a longitudinal direction that is transverse to said lateral axis of rotation and said first and second electric motors extend generally parallel to a ground surface, said first electric motor being positioned on one immediate side of a longitudinal vehicle axis and said second electric motor being positioned on an opposite immediate side of said longitudinal vehicle axis.

10. The drive axle according to claim 1 wherein said first and second longitudinal axes are parallel to each other and spaced apart from each other by a lateral distance, and wherein said first longitudinal axis is spaced apart from said first wheel end assembly by said first distance and said second longitudinal axis is spaced apart from said second wheel end assembly by said second distance, said lateral distance being less than each of said first and second distances.

11. A drive axle comprising:
a first wheel end assembly defining a lateral axis of rotation;
a second wheel end assembly laterally spaced from said first wheel end assembly along said lateral axis of rotation;
a first electric motor operably coupled to drive said first wheel end assembly;
a second electric motor operably coupled to drive said second wheel end assembly independently from said first wheel end assembly wherein said first electric motor is laterally spaced apart from said first wheel end assembly along said lateral axis of rotation by a first distance, said second electric motor is laterally spaced apart from said second wheel end assembly along said lateral axis of rotation by a second distance, and said first and second electric motors are spaced apart from each other along said lateral axis of rotation by a third distance, said first and second distances both being greater than said third distance; and
an axle housing assembly extending between said first and second wheel end assemblies wherein said first and second electric motors are solely supported by said axle housing assembly.

12. The drive axle according to claim 11 wherein said axle housing assembly includes a first axle housing portion extending between said first electric motor and said first wheel end assembly, a second axle housing portion extending between said second electric motor and said second wheel end assembly, and a third axle housing portion positioned between said first and said second axle housing portions.

13. The drive axle according to claim 12 wherein said first electric motor and said second electric motor are mounted to said third axle housing portion.

14. A drive axle comprising:
a first wheel end assembly defining a lateral axis of rotation;
a second wheel end assembly laterally spaced from said first wheel end assembly along said lateral axis of rotation;
an axle housing extending between said first and second wheel end assemblies and having a central portion that is extendable across a longitudinal vehicle centerline that intersects said lateral axis of rotation;
a first electric motor operably coupled to drive said first wheel end assembly; and
a second electric motor operably coupled to drive said second wheel end assembly independently from said first wheel end assembly wherein said first and second electric motors are supported on said central portion of said axle housing and solely supported by said axle housing, and wherein said first and said second electric motors are positionable closer to said longitudinal vehicle centerline than to said first and second wheel end assemblies.

15. The drive axle according to claim 14 wherein said axle housing includes a first housing portion, a second housing portion, and a third housing portion positioned between said first and second housing portions, said first and second electric motors being mounted to said third housing portion.

16. The drive axle according to claim 15 wherein said first, second, and third housing portions have generally equal lengths.

17. The drive axle according to claim 15 wherein said first housing portion extends between said first electric motor and said first wheel end assembly and said second housing portion extends between said second electric motor and said second wheel end assembly.

18. The drive axle according to claim 17 including a first gear set driven by said first electric motor and a first axle shaft driven by said first gear set about said lateral axis of rotation, said first axle shaft being substantially enclosed by said first housing portion; and including a second gear set driven by said second electric motor and a second axle shaft driven by said second gear set about said lateral axis of rotation, said second axle shaft being substantially enclosed by said second housing portion.

19. The drive axle according to claim 18 wherein said first wheel end assembly includes a first planetary gear set driven by said first axle shaft and said second wheel end assembly includes a second planetary gear set driven by said second axle shaft.

20. The drive axle according to claim 18 wherein said first electric motor includes a first motor output shaft defining a first longitudinal axis of rotation, and said first gear set includes a first pinion gear driven by said first motor output shaft about said first longitudinal axis of rotation and a first ring gear driven by said first pinion gear about said lateral axis of rotation; and wherein said second electric motor includes a second motor output shaft defining a second longitudinal axis of rotation, and said second gear set includes a second pinion gear driven by said second motor output shaft about said second longitudinal axis of rotation and a second ring gear driven by said second pinion gear about said lateral axis of rotation.

21. The drive axle according to claim 14 wherein said first electric motor includes a first motor housing defining a longitudinal length that is generally parallel to said longitudinal vehicle centerline and said second electric motor includes a second motor housing defining a longitudinal length that is generally parallel to said longitudinal vehicle centerline, said first motor housing being positioned on one immediate side of said longitudinal vehicle centerline and said second electric motor being positioned on an opposite immediate side of said longitudinal vehicle centerline.

22. The drive axle according to claim 14 wherein said first electric motor includes a first motor output shaft that rotates about a first longitudinal axis parallel to said longitudinal vehicle centerline and said second electric motor includes a second motor output shaft that rotates about a second longitudinal axis that is parallel to said first longitudinal axis, said first motor output shaft being laterally spaced apart from said second motor output shaft by a first lateral distance, and wherein said first electric motor is laterally spaced apart from said first wheel end assembly by a second lateral distance and said second electric motor is laterally spaced apart from said second wheel end assembly by a third lateral distance, said first lateral distance being less than each of said second and third lateral distances.

* * * * *

UNITED STATES PATENT AND TRADEMARK OFFICE
CERTIFICATE OF CORRECTION

| | |
|---|---|
| PATENT NO. | : 7,314,105 B2 |
| APPLICATION NO. | : 10/942709 |
| DATED | : January 1, 2008 |
| INVENTOR(S) | : Varela et al. |

Page 1 of 1

It is certified that error appears in the above-identified patent and that said Letters Patent is hereby corrected as shown below:

Claim 5, Column 5, line 48: Insert --set-- after "gear" and before "."

Signed and Sealed this

Twenty-seventh Day of May, 2008

JON W. DUDAS
*Director of the United States Patent and Trademark Office*